United States Patent [19]

Volk

[11] Patent Number: 4,676,265

[45] Date of Patent: Jun. 30, 1987

[54] VACUUM PUMP DRAIN DEVICE

[76] Inventor: Kenneth J. Volk, 4805 Cheyenne Way, Chino, Calif. 91710

[21] Appl. No.: 245,187

[22] Filed: Mar. 18, 1981

[51] Int. Cl.4 .............................................. F16K 31/20
[52] U.S. Cl. .................................... 137/172; 137/192; 137/429
[58] Field of Search .......................... 417/313; 418/97; 137/172, 192, 433, 429

[56] References Cited

U.S. PATENT DOCUMENTS

| 1,344,663 | 8/1920 | Waldrep . |
| 1,536,686 | 5/1925 | Mullen ............................ 137/192 X |
| 1,548,298 | 10/1925 | Woodard . |
| 1,729,484 | 8/1929 | Lee . |
| 1,732,222 | 4/1929 | Cantrall . |
| 1,750,489 | 3/1930 | Pippin . |
| 1,873,597 | 5/1932 | Jones . |
| 1,908,207 | 11/1933 | Wrenn . |
| 2,844,254 | 6/1958 | Ansley . |
| 3,012,675 | 3/1961 | Phelps et al. . |
| 3,115,888 | 2/1963 | Moyer . |

FOREIGN PATENT DOCUMENTS 2449908  4/1976  Fed. Rep. of Germany ........ 418/97

Primary Examiner—Alan Cohan
Attorney, Agent, or Firm—Laney, Dougherty, Hessin & Beavers

[57] ABSTRACT

A vacuum pump drain device for draining contaminating water from the oil reservoir of a vacuum pump. A valve regulates the flow of water through an outlet port disposed adjacent the water responsive to the level of the oil in the oil reservoir. Preferably, the valve includes a float attached to an outlet port seal by a shaft or the like.

12 Claims, 2 Drawing Figures

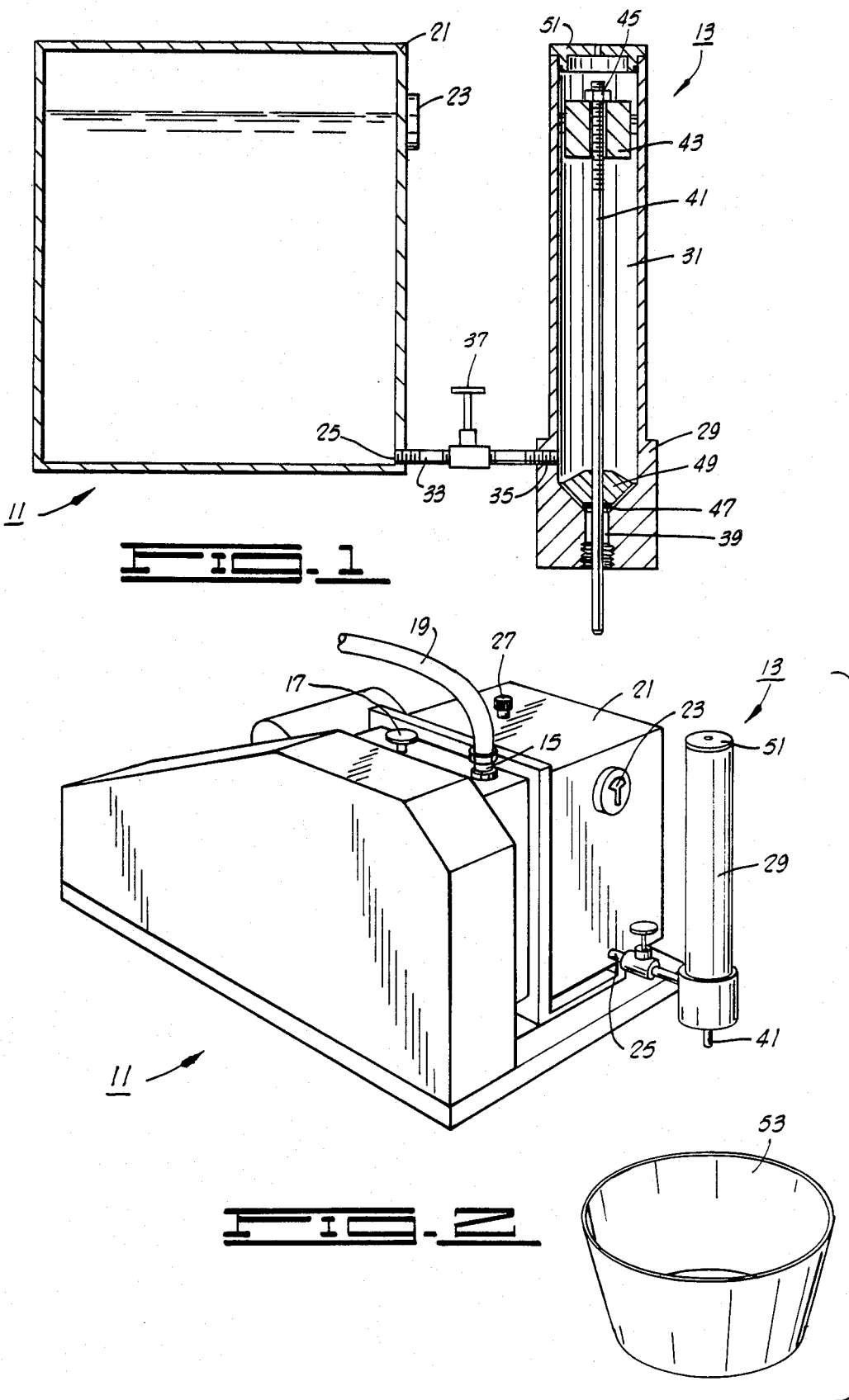

VACUUM PUMP DRAIN DEVICE

BACKGROUND OF THE INVENTION

1. Field of the Invention

The present invention relates in general to vacuum pumps and more particularly to vacuum pumps of the type having a lubricant reservoir holding a liquid lubricant for lubricating and sealing moving part of the vacuum pump.

2. Brief Description of the Prior Art

Many of the vacuum pumps presently available utilize oil for lubrication and sealing against loss of vacuum. Generally, a reservoir of oil is provided and circulated through the vacuum pump stages to lubricate the moving parts of the vacuum pump and to provide a gas seal between the inlet and outlet and various chambers of the vacuum pump.

A well known problem of the prior art concerns contamination of the oil in the oil reservoir. As the vacuum pump operates, gases compressed within the pump liquefy and mix with the oil. The most common contaminating gas is water vapor. After the water vapor is condensed and contaminates the oil reservoir, the oil circulated through the pump cannot properly seal and lubricate the moving parts of the vacuum pump.

In an attempt to solve the water contamination of the oil reservoir some vacuum pumps allow gas to enter and be vented from the compression chamber of the pump reducing the partial pressure of the water vapor. In this manner, less of the water vapor reaches its saturation pressure and condenses within the pump. However, this increases the gas pressure within the compression stroke making the pump less efficient and increasing the temperature of the pump as it operates. Furthermore, even with the gas venting of the compression chamber, water vapor condenses within the oil reservoir so that in prolonged usages of the pump, water builds up and must be drained from the oil reservoir.

Many uses of vacuum pumps require prolonged operation of the vacuum pump. For example, in order to remove water vapor contamination of a refrigeration line, it is often necessary to evacuate the refrigeration line for days at a time. Furthermore, whether the vacuum pump utilizes a vented exhaust or not, operation for this amount of time has required that the pump be monitored intermittently to insure that water contamination does not destroy the pump. This has generally required service personnel to visit the pump every few hours to check the oil level within the pump which indicates whether or not water contamination is occurring. When the oil level reaches a dangerous height, water which has accumulated at the bottom of the reservoir is drained by means of a manual valve.

As can be seen, monitoring of the vacuum pumps is expensive and undesirable. While there have been a wide variety of devices utilized for separating oil and water, no satisfactory device has been found for separating the contaminating water from a vacuum pump as it operates.

SUMMARY OF THE INVENTION

It is an object of the present invention to provide an improved vacuum pump with a drain for draining contaminating water from the oil reservoir which does not require frequent monitoring and manual operation.

It is also an object of the present invention to provide a device which can be attached to existing vacuum pumps for draining contaminating water as described above.

It is still further an object of the present invention to provide an improved drain for a vacuum pump which is sensitive in its operation to small changes in the amount of contaminating water in the oil reservoir.

Yet another object of the present invention is to provide a vacuum pump and drain as described above which can be easily manufactured and yet is reliable in its operation.

In accordance with these objects the present invention provides a draining device which can be attached to a vacuum pump of the type having an oil reservoir. The device comprises a container having a chamber for holding a liquid. Connecting means are provided for connecting the chamber to the oil reservoir of the vacuum pump in a liquid conducting relationship such that contaminants such as water in the oil reservoir will be communicated with the chamber. The container has an outlet port disposed for draining contaminants such as water from the chamber. Valve means are provided for regulating the draining of liquid from the chamber through the outlet port responsive to the liquid level in the chamber such that the level of liquid in the chamber can be maintained by draining contaminants such as water from the chamber through the outlet port. Thus, as contaminants such as water are added to the oil reservoir and are communicated to the chamber in the container raising the liquid level in the chamber the valve means drains the water from the chamber responsive to the raising of the liquid level.

With the elements described above the present invention provides an improved vacuum pump with a drain and valve for draining contaminants from the oil reservoir responsive to the liquid level in the reservoir.

Preferably, the valve means of the present invention comprises a float disposed for moving with the liquid level in the chamber or reservoir. A seal means is disposed across the outlet port for selectively sealing the outlet port. Shaft means connect the seal means to the float such that the seal means selectively seals and unseals the outlet port responsive to the movement of the float.

Also preferably, a funnel-shaped opening is provided about the outlet port and a filler piece is connected about the shaft means adjacent the seal means and disposed within this funnel-shaped opening. In this manner, only a cone-shaped section of liquid about the filler piece is communicated with the outlet port as the outlet port is unsealed. This increases the sensitivity of the draining device.

For a further understanding of the invention and further objects, features and advantages thereof, reference may now be had to the following description taken in conjunction with the accompanying drawings.

BRIEF DESCRIPTION OF THE DRAWINGS

FIG. 1 is a cross-sectional view of a vacuum pump and drain of the present invention with the vacuum pump portion shown schematically.

FIG. 2 is a prospective view of the device shown in FIG. 1.

DESCRIPTION OF THE PREFERRED EMBODIMENTS

Referring now to FIGS. 1 and 2, the vacuum pump and drain of the present invention are shown generally at 11. Except for the drain portion 13, the vacuum pump 11 is of conventional design. The vacuum pump includes a suction inlet 15 and a pressure outlet 17. The suction inlet 15 is connected to an object to be evacuated, such as a refrigeration line, by a hose 19 connected to suction inlet 15.

The vacuum pump 11 includes an oil case 21 which houses a reservoir of oil utilized in sealing and lubricating the working parts of the vacuum pump. The oil case 21 has a watch glass 23 disposed on its upper side portion to allow observation of the oil level within the oil case. A drain port 25 is provided at the lower end of oil case 23 to allow water and oil to be drained from the oil case 21. The drain port 25 is disposed at the lower end of the reservoir within oil case 21 so that water which sinks below the less dense oil can be drained without draining the oil located thereabove.

The vacuum pump 11 also includes an air inlet 27 which allows air to be supplied to the compression stroke by means of a vented exhaust valve within the pump. This air intake valve reduces the efficiency of the pump but also reduces the amount of water vapor condensed within the pump.

Except for the drain portion 13, the vacuum pump 11 is conventional. Therefore, other working parts of the vacuum pump are not described in more detail. An example of a conventional vacuum pump is presently sold by Seargent-Welch Scientific Company under the Model Number 1402.

The drain portion 13 of the present invention includes a cylindrical container 29 having a cylindrical chamber 31 therein. Container 29 is attached to the oil case 21 by a threaded pipe 33. The pipe 33 is threaded into drain port 25 of oil case 21 and an inlet port 35 in container 29. Pipe 33 connects the oil reservoir in oil case 21 to the chamber 31 in container 29 so that liquid can be conducted from the oil reservoir to chamber 31. In fact, because of the connection through pipe 33, the chamber 31 can be considered an extension of the oil reservoir.

A manually operated valve 37 is provided on pipe 33 to regulate the flow of liquid between the oil case 21 and the container 29. In the prior art, a manual valve in this position was utilized to remove water which had accumulated in the oil reservoir.

When attached to oil case 21, container 29 is oriented so that chamber 31 extends from above the maximum oil level to below the drain port 25. This allows the fluid level within chamber 31 to fluctuate with the fluid level in oil case 21.

An outlet port 39 is disposed at the lower end of chamber 31. This location for outlet port 39 allows water which enters chamber 31 through pipe 33 to be retained adjacent outlet port 39 and below any oil contained within chamber 31. In this manner, water can be drained from chamber 31 through outlet 39 without draining oil therefrom.

Extending through outlet port 39 and axially through chamber 31 is a shaft 41. Attached to the upper end of shaft 41 is a float 43. Float 43 is cylindrically shaped and extends about shaft 41 inside shaft 31. Float 43 and the attached shaft 41 move with the liquid level in chamber 31. Thus, as the liquid level in chamber 31 declines, the float 43 and shaft 41 are urged downwardly and as the liquid level in chamber 31 increases, float 43 and shaft 41 are urged upwardly.

Float 43 can be made of a variety of materials which are buoyant in oil. Preferably, the material should be resistant to reaction with the oil and its density should not change with immersion in oil. Expanded polystyrene coated with epoxy is one such material.

The upper end of shaft 41 is threaded and float 43 is attached to shaft 41 by means of a threaded nut 45. This allows the positioning of float 43 along shaft 41 to be adjusted.

Attached to the lower end of shaft 41 is an O-ring seal 47. The seal 47 is positioned adjacent outlet port 39 so that when shaft 41 is lowered seal 47 closes outlet port 39 and prevents fluids from draining from chamber 31. The O-ring seal 47 can be made of rubber or other materials which will provide a good seal between shaft 41 and the outlet port 39.

The lower end of chamber 31 is funnel-shaped and the outlet port 39 is located at the lower end of this funnel-shaped portion. A filler piece 49 is connected to shaft 41 just above O-ring seal 47. This positions the filler piece 49 within the funnel-shaped portion of chamber 31. The filler piece 49 has an inverted cone shape so that only a cone-shaped space is provided above outlet port 39. The upper end of filler piece 49 is inclined so that water will not be retained above the piece 49 as water drains through port 39.

The filler piece 49 makes the draining of liquid through port 39 more sensitive since a smaller volume of liquid is disposed adjacent port 39. Also, as liquid flows through port 39 the motion of the liquid tends to pull the filler piece 49 downwardly which urges the outlet port 39 to be sealed by O-ring seal 47.

Container 29 is provided with a cap 51 which extends over the upper end of container 29. Cap 51 is provided with an opening to allow air to circulate above the liquid in chamber 31. Where the oil in the vacuum pump is pressurized, the opening in cap 51 could be omitted and the chamber 31 sealed to retain the pressure.

In operation, chamber 31 is filled with oil so that the oil level within the oil case 21 and within chamber 31 is at a proper height. Of course, as long as valve 37 is open the liquid level within chambers 31 and oil case 21 will remain the same.

After a desired oil level has been achieved, float 43 is adjusted along shaft 41 so that any increase in the oil level 43 causes the shaft 41 to rise and the O-ring seal 47 to unseal the outlet port 39. When this occurs, liquid drains from the lower end of chamber 31 until the decrease in the liquid level causes the float 43 to urge the shaft 41 and seal 47 downwardly.

When water is added to the oil in oil case 21, the more dense water falls to the bottom of the oil case and is communicated through pipe 33 to chamber 31. It also causes the level of the oil to rise. This in turn, causes the outlet port to be opened responsive to the movement of float 43 with the oil level. Water then drains from the chamber 31 until the oil level falls to a point which indicates that most of the water has been drained from the chamber 31 and the oil case 21.

As the water drains from the container 29 through outlet port 39 it is desirable to catch the water in a bucket 53. Alternatively, the lower end of the outlet port 39 is threaded to allow a hose to be attached to outlet port 39. The hose (not shown) can direct the drained water into a suitable location.

As described above, the chamber 31 forms an extension of the oil reservoir in oil case 21. If desired, the shaft 41, float 43, outlet port 39, etc. could be disposed within the oil case 21 so that a separate container 29 would not be required. However, a disadvantage of this configuration is that adjustment of the float 43 and repair of the other components would be more difficult if these components were housed in the oil case 21.

As can be seen, the drain portion 13 can be easily attached to a conventional vacuum pump so that a conventional vacuum pump will drain water responsive to the oil level within the pump. This eliminates the need to monitor the oil level as the pump operates for extended periods of time.

Thus, the drain device for a vacuum pump of the present invention is well adpated to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. A device for draining lubricant-immiscible liquid contaminants from a conventional vacuum pump of the type having a lubricant reservoir for holding a liquid lubricant for lubricating moving parts of the vacuum pump, said device comprising:
   a container having a chamber for holding a liquid;
   connecting means for removably connecting said chamber to the lubricant reservoir in a liquid-conducting relationship such that lubricant-immiscible liquid contaminants in the lubricant reservoir will be communicated with said chamber;
   said container having an outlet port disposed for draining lubricant-immiscible liquid contaminants from said chamber;
   said chamber having a vertical interior wall ending in a funnel-shaped lower portion with said outlet port being disposed at the lower end of said funnel-shaped portion;
   valve means for regulating and draining of liquid from said chamber through said outlet port responsive to the liquid level in said chamber such that the level of liquid in said chamber can be maintained by draining the lubricant-immiscible liquid contaminants from said chamber through said outlet port as lubricant-immiscible liquid contaminants are added through the lubricant reservoir and are communicated to said chamber raising the liquid level therein, said valve means comprising:
   a float disposed in said chamber for moving with the level of liquid in said chamber;
   seal means disposed across said outlet port; and
   shaft means connecting said seal means and said float such that seal means selectively seals and unseals said outlet port responsive to the movement of said float; and
   a filler piece connected about said shaft means and disposed within said funnel-shaped lower portion of the chamber forming a cone-shaped section of liquid above said outlet port when said outlet port is sealed such that only a cone-shaped section of liquid about said filler piece is communicated with said outlet port as said outlet port is unsealed.

2. The device of claim 1 wherein said filler piece has an inclined upper surface so that lubricant-immiscible liquid contaminants will not be retained above said filler piece as said liquid drains from said chamber through said outlet port.

3. The device of claim 2 wherein said float is adjustably attached by a nut threaded to said shaft means such that said seal means can be responsive to different liquid levels in said chamber.

4. An improved vacuum pump of the type having a lubricant reservoir for holding a liquid lubricant which lubricates moving parts of the vacuum pump, the improvement comprising:
   said reservoir having an outlet port disposed for draining from said reservoir lubricant-immiscible liquid contaminants contained within said reservoir;
   said reservoir having a vertical interior wall ending in a funnel-shaped lower portion with said outlet port being disposed at the lower end of said funnel-shaped portion;
   valve means for regulating the draining of liquid from said reservoir through said outlet port responsive to the liquid level in said reservoir such that the level of liquid in said reservoir can be maintained by draining the lubricant-immiscible liquid contaminants from said reservoir through said outlet port as lubricant-immiscible liquid contaminants are added to said lubricant reservoir raising the liquid level therein, said valve means comprising:
   a float disposed in said reservoir for moving within the level of liquid in said reservoir;
   seal means disposed across said outlet port for selectively sealing said outlet port; and
   shaft means for connecting said seal means and said float such that said seal means selectively seals and unseals said outlet port responsive to the movement of said float; and
   a filler piece connected about said shaft means adjacent said seal means and disposed within said funnel-shaped lower portion of said reservoir forming a cone-shaped section of liquid above said outlet port when said outlet port is sealed such that only a cone-shaped section of liquid about said filler piece is communicated with said outlet port as said outlet port is unsealed.

5. The pump of claim 4 wherein said filler piece has an inclined upper surface so that lubricant-immiscible liquid contaminants will not be retained above said filler piece as liquid drains from said chamber through said outlet port.

6. The pump of claim 5, wherein said float is adjustably attached by a nut threaded to said shaft means such that said seal means can be responsive to different liquid levels in said reservoir.

7. A device for draining water from a vacuum pump of the type having an oil reservoir for holding oil which lubricates the moving part of the vacuum pump, said device comprising:
   a cylindrical container having a cylindrical chamber for holding liquid therein;
   connecting means for removably connecting said container to the vacuum pump such that said chamber extends from above the maximum oil level of the oil reservoir and below the minimum level of the oil reservoir, and such that said chamber is connected in a liquid-conducting relationship with the oil reservoir in a manner so that water in the oil reservoir will be communicated with and can be conducted to said chamber and so that the liquid level in said chamber can be the same height as the liquid level in the oil reservoir;

said container having an outlet port disposed at its lower end for draining water from said chamber;

said chamber having a vertical interior wall ending in a funnel-shaped lower portion with said outlet port being disposed at the lower end of said funnel-shaped portion;

a float disposed within said chamber for moving with the level of liquid in said chamber;

seal means disposed across said outlet port for selectively sealing said outlet port;

shaft means connecting said seal means and said float such that said seal means selectively seals and unseals said outlet port responsive to the movement of said float; and a filler piece connected about said shaft means adjacent said seal means and disposed within said funnel-shaped lower portion of said chamber forming a cone-shaped section of liquid above said outlet port when said outlet port is sealed such that only a cone-shaped section of liquid about said filler piece is communicated with said outlet port as said outlet port is unsealed.

8. The device of claim 7 wherein said filler piece has an inclined upper surface so that water will not be retained above said filler piece as liquid drains from said chamber through said outlet port.

9. The device of claim 8 wherein said float is adjustably attached by a nut threaded to said shaft means such that said seal means can be responsive to different liquid level in said chamber.

10. An improved pump of the type having an oil reservoir for holding oil which lubricates moving parts of the vacuum pump, the improvement comprising:

said oil reservoir having an outlet port disposed for draining from said oil reservoir water contained within said reservoir;

said oil reservoir having a vertical interior wall ending in a funnel-shaped lower portion with said outlet port being disposed at the lower end of said funnel-shaped portion;

a float disposed in said oil reservoir for moving with the level of liquid in said reservoir;

seal means disposed across said outlet port for selectively sealing said outlet port;

shaft means connecting said seal means and said float such that said seal means selectively seals and unseals said outlet port responsive to the movement of said float; and a filler piece connected about said shaft means adjacent said seal means and disposed within said funnel-shaped lower portion of said oil reservoir forming a cone-shaped section of liquid above said outlet port when said port is sealed such that only a cone-shaped section of liquid about said filler piece is communicated with said outlet port as said outlet port is unsealed.

11. The pump of claim 10 wherein said filler piece has an inclined upper surface so that water will not be retained above said filler piece as liquid drains from said oil reservoir through said outlet port.

12. The pump of claim 11 wherein said float is adjustably attached by a nut threaded to said shaft means such that said seal means can be responsive to different liquid levels in said oil reservoir.

* * * * *

UNITED STATES PATENT AND TRADEMARK OFFICE
CERTIFICATE OF CORRECTION

PATENT NO. : 4,676,265
DATED : June 30, 1987
INVENTOR(S) : Kenneth J. Volk

It is certified that error appears in the above-identified patent and that said Letters Patent are hereby corrected as shown below:

Column 1, line 9, delete "part" and insert --parts-- therefor.

Claim 1, line 33, insert --said-- after "that" and before "seal".

Claim 7, line 3, delete "part" and insert --parts-- therefor.

Claim 9, line 4, delete "level" and insert --levels-- therefor.

Signed and Sealed this

Twenty-seventh Day of October, 1987

*Attest:*

DONALD J. QUIGG

*Attesting Officer*  Commissioner of Patents and Trademarks